US009091898B2

(12) United States Patent
Greer et al.

(10) Patent No.: US 9,091,898 B2
(45) Date of Patent: Jul. 28, 2015

(54) PARTIALLY TINTED CLEAR STATE FOR IMPROVED COLOR AND SOLAR HEAT GAIN CONTROL OF ELECTROCHROMIC DEVICES

(71) Applicant: SAGE Electrochromics, Inc., Faribault, MN (US)

(72) Inventors: Bryan D. Greer, Northfield, MN (US); Erik J. Bjornard, Lakeville, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 0 days.

(21) Appl. No.: 14/584,559

(22) Filed: Dec. 29, 2014

(65) Prior Publication Data
US 2015/0109653 A1 Apr. 23, 2015

Related U.S. Application Data

(62) Division of application No. 13/650,952, filed on Oct. 12, 2012, now Pat. No. 8,947,759.

(51) Int. Cl.
G02F 1/153 (2006.01)
G02F 1/163 (2006.01)

(52) U.S. Cl.
CPC .................................... *G02F 1/163* (2013.01)

(58) Field of Classification Search
USPC .......................................... 359/265–275, 900
See application file for complete search history.

(56) References Cited

U.S. PATENT DOCUMENTS

| 5,889,608 | A | 3/1999 | Buffat et al. |
| 6,055,089 | A | 4/2000 | Schulz et al. |
| 7,133,181 | B2 | 11/2006 | Greer |
| 2003/0227663 | A1 | 12/2003 | Agrawal et al. |
| 2012/0268803 | A1 | 10/2012 | Greer et al. |
| 2013/0222877 | A1 | 8/2013 | Greer et al. |
| 2013/0222878 | A1 | 8/2013 | Greer et al. |

OTHER PUBLICATIONS

Gueymard C A et al: "Spectral effects on the transmittance, solar heat gain, and performance rating of glazing systems", Solar Energy, Pergamon Press. Oxford, GB, vol. 83, No. 6, Jun. 1, 2009, pp. 940-953, XP026091052.
International Search Report and Written Opinion for Application No. PCT/US2013/064529 dated Jun. 3, 2014.
Neil L Sbar et al: "Electrochromic dynamic windows for office buildings", International Journal of Sustainable Built Environment, vol. 1, No. 1, Jun. 1, 2012, pp. 125-139, XP055119634.
Partial Search Report for Application No. PCT/US2013/064529 dated Feb. 7, 2014.

*Primary Examiner* — Jack Dinh
(74) *Attorney, Agent, or Firm* — Abel Law Group, LLP; Robert N Young

(57) ABSTRACT

A control device for controlling the transmittance of an electrochromic device includes a power source, an electrical load sensing circuit, and a processor electrically coupled to the electrical load sensing circuit and a power source. The processor is configured to receive a measured electrical load value from the electrical load sensing circuit indicating an electrical property of the electrochromic device, further configured to control one or more properties of the electrochromic device by controlling the amount of current or voltage supplied from the power source to the electrochromic device, and yet further configured to vary a property of the electrochromic device while maintaining the electrochromic device at a substantially consistent transmissivity.

20 Claims, 8 Drawing Sheets

|  | Warm Interior space | Cool Interior space |
|---|---|---|
| Yellow color tolerated | State A | State B |
| Yellow color not tolerated | State B | State B |

FIGURE 7

| Occupied? | Heat desired? | Excess daylight? | Excess glare? | |
|---|---|---|---|---|
| Y | X | Y | Y | Set to minimum transmissivity state |
| Y | X | Y | N | Set to transmission state yielding desired illuminance |
| Y | Y | N | N | Set to high SHGC clear state (State A) |
| Y | N | N | N | Set to low SHGC clear state (State B) |
| N | Y | X | X | Set to high SHGC clear state (State A) |
| N | N | X | X | Set to minimum transmissivity state |

FIGURE 8

PARTIALLY TINTED CLEAR STATE FOR IMPROVED COLOR AND SOLAR HEAT GAIN CONTROL OF ELECTROCHROMIC DEVICES

CROSS-REFERENCE TO RELATED APPLICATION

The present application is a divisional application and claims priority under 35 U.S.C. §120 to U.S. patent application Ser. No. 13/650,952, filed Oct. 12, 2012, entitled "Partially Tinted Clear State for Improved Color and Solar Heat Gain Control of Electrochromic Devices", naming as inventors Greer et al., which is incorporated by reference herein in its entirety.

BACKGROUND

Electrochromic materials and devices have been developed as an alternative to passive coating materials for light and heat management in building and vehicle windows. In contrast to passive coating materials, electrochromic devices employ materials capable of reversibly altering their optical properties following electrochemical oxidation and reduction in response to an applied potential. The optical modulation is the result of the simultaneous insertion and extraction of electrons and charge compensating ions in the electrochemical material lattice.

In general, electrochromic devices have a composite structure through which the transmittance of light can be modulated. FIGS. 1A and 1B illustrate plan and cross-sectional views, respectively, of a typical prior art electrochromic device 20. The device 20 includes isolated transparent conductive layer regions 26A and 26B that have been formed on a substrate 34, such as glass. In addition, the device 20 includes a counter electrode layer 28, an ion conductive layer 32, an electrochromic layer 30 and a transparent conductive layer 24, which have been deposited in sequence over the conductive layer regions 26. It is to be understood that the relative positions of the electrochromic and counter electrode layers of the device 20 may be interchanged. Further, the device 20 includes a bus bar 40 which is in contact only with the conductive layer region 26A, and a bus bar 42 which may be formed on the conductive layer region 26B and is in contact with the conductive layer 24. The conductive layer region 26A is physically isolated from the conductive layer region 26B and the bus bar 42, and the conductive layer 24 is physically isolated from the bus bar 40. Although an electrochromic device may have a variety of shapes, such as including curved sides, the illustrative, exemplary device 20 is a rectangular device with the bus bars 40 and 42 extending parallel to each other, adjacent to respective opposing sides 25, 27 of the device 20, and separated from each other by a distance W. Further, the bus bars 40 and 42 are connected by wires to positive and negative terminals, respectively, of a low voltage electrical source 22 (the wires and the source 22 together constituting an "external circuit").

Referring to FIGS. 1A and 1B, when the source 22 is operated to apply an electrical potential across the bus bars 40, 42, electrons, and thus a current, flows from the bus bar 42, across the transparent conductive layer 24 and into the electrochromic layer 30. In addition, if the ion conductive layer 32 is an imperfect electronic insulator as is the case in many thin film electrochromic devices, a small current, commonly referred to as a leakage current, flows from the bus bar 42, through the conductive layer 24 and the electrochromic layer 30, and into the ion conductive layer 32. Further, ions flow from the counter electrode layer 28, through the ion conductive layer 32, and to the electrochromic layer 30, and a charge balance is maintained by electrons being extracted from the counter electrode layer 28, and then being inserted into the electrochromic layer 30 via the external circuit. As the current flows away from the bus bar 42 across the conductive layer 24 and towards the bus bar 40, voltage is dropped by virtue of the finite sheet resistance of the conductive layer 24, which is typically about 3-20 Ohms/square. In addition, current flowing across the conductive layer 24 is incrementally reduced, as current is drawn through the combination of the layers 30, 32 and 28 ("stack") to produce the electrochromic coloration in the device 20.

SUMMARY

Some embodiments provide a control device for controlling the transmittance of an electrochromic device. The control device may comprise a power source electrically coupled to the electrochromic device. The power source may be configured to supply power to the electrochromic device. The control device may also comprise an electrical load sensing circuit coupled to the electrochromic device. The electrical load sensing circuit may be configured to measure at least one of a voltage and a current supplied to the electrochromic device. The control device may further comprise a processor electrically coupled to the electrical load sensing circuit and the power source. The processor may be configured to receive a measured electrical load value from the electrical load sensing circuit indicating an electrical property of the electrochromic device, and to control one or more properties of the electrochromic device by controlling the amount of current or voltage supplied from the power source to the electrochromic device. The processor may further be configured to vary a property of the electrochromic device while maintaining the electrochromic device at a substantially consistent transmissivity. For example, in some embodiments, the processor may be configured to set the electrochromic device to a first transmission state and second transmission state, the first transmission state having a transmissivity within 5% of the transmissivity of the second transmission state.

In some embodiments, the processor may be configured to set the electrochromic device to a first transmission state having a high b* characteristic value and a second transmission state having a low b* characteristic value. In some embodiments, the difference between the high b* characteristic value and the low b* characteristic value may be about 4.5. Also, in some embodiments, both the first transmission state and the second transmission state may have a b* characteristic value about 8 or greater.

In some embodiments, the processor may be configured to set the electrochromic device to a first transmission state having a high solar heat gain coefficient and a second transmission state having a low solar heat gain coefficient. In some embodiments, the difference between the high solar heat gain coefficient and the low solar heat gain coefficient may be between about 15% to about 25%. Also, in some embodiments, both the first transmission state and the second transmission state may have a solar heat gain coefficient between about 0.4 and about 0.55.

In some embodiments, the processor may be configured to set the electrochromic device to a first transmission state having a color with a peak wavelength of between about 560 nm and about 595 nm, and a second transmission state having a second color substantially different from the first color. In some embodiments, the distance between the first color and the second color in L*a*b* color space may be about 5 or greater.

In some embodiments, the processor may be configured to set the electrochromic device to a first transmission state having a first amount of infrared radiation transmitted through the electrochromic device and a second transmission state having a second amount of infrared radiation transmitted through the electrochromic device substantially different from the first amount.

In some embodiments, both the first transmission state and the second transmission state admit at least about 60% of visible light to be transmitted through the electrochromic device.

Also in some embodiments, the power source of the control device may further comprise a photovoltaic cell. The control device may further comprise a memory circuit that stores correlation information indicating a correlation between a first property of the electrochromic device and a second property of the electrochromic device, and the processor may be further configured to control the electrochromic device based on the correlation information. In one embodiment, the first property may be a color of the electrochromic device and the second property an amount of visible light transmitted by the electrochromic device. In another embodiment, the first property of the electrochromic device may instead be an amount of infrared radiation transmitted through the electrochromic device. The memory circuit may further comprise climate information indicating at least one of a current date, a current time, and a current position of the Sun relative to the electrochromic device.

Also in some embodiments, the processor may be configured to receive an input and control the electrochromic device based on the input received. In one embodiment, the input may be received from an occupancy sensor indicating whether a space associated with the electrochromic device is vacant or occupied. In another embodiment, the input may be received from a temperature sensor indicating a temperature of the space associated with the electrochromic device. In yet another embodiment, the input may be received from an infrared sensor indicating an amount of infrared radiation transmitted through the electrochromic device. In yet a further embodiment, the input may be received from a daylight sensor indicating an illuminance of the space associated with the electrochromic device. In some embodiments, the space may be an interior space, such as one of a room in a house, an office in a building, or a vehicle (e.g., car, airplane) interior.

In other some embodiments, a method for controlling transmissivity of an electrochromic device includes determining a range of transmission states for which an illuminance in a space associated with the electrochromic device is within a threshold amount from a desired illuminance, receiving a color input indicating a range of colors at which is unacceptable to maintain the electrochromic device. In some embodiments, when at least one transmission state within the determined range of transmission states is a color that is not within the range of colors, the method includes setting the electrochromic device to a first transmission state within the determined range of transmission states, the first transmission state having a color that is not within the range of colors. In some embodiments, when every transmission state within the determined range of transmission states is within the range of colors, the method includes setting the electrochromic device to a second transmission state having a color that is not within the range of colors, the second transmission state having a transmissivity that is substantially similar to the transmissivity of the first transmission state.

In other embodiments, a method for controlling transmissivity of an electrochromic device may include determining a range of transmission states for which an illuminance in a space associated with the electrochromic device is within a threshold amount from a desired illuminance, receiving a color input indicating a range of colors at which is unacceptable to maintain the electrochromic device. When at least one transmission state within the determined range of transmission states is a color that is not within the range of colors, the method may include setting the electrochromic device to a first transmission state within the determined range of transmission states, the first transmission state having a color that is not within the range of colors. When every transmission state within the determined range of transmission states is within the range of colors, the method may include setting the electrochromic device to a second transmission state having a color that is not within the range of colors, the second transmission state having a transmissivity that is substantially similar to the transmissivity of the first transmission state.

In some embodiments, the illuminance input may be received from a daylight sensor. The color input may be received from a user input.

Also in some embodiments, the range of colors at which is less preferred to maintain the electrochromic device may include a color having a peak wavelength of between about 560 nm and about 595 nm. Additionally, the visible light transmittance of the electrochromic device may be about 5% lower when operating in the second transmission state than when operating in the first transmission state.

In other embodiments, a method for controlling transmissivity of an electrochromic device may include receiving an illuminance input indicating an amount of illuminance in a space, receiving a color input indicating whether a high b* characteristic value is tolerated for the electrochromic device, and determining a desired range of transmission states based on the illuminance input. When a high b* characteristic value is tolerated for the electrochromic device, the method may include setting the electrochromic device to a first transmission state within the desired range of transmission states and associated with a first color of the electrochromic device, the first color having a high b* characteristic value. When a high b* characteristic value is not tolerated for the electrochromic device, the method may include setting the electrochromic device to a second transmission state, also within the desired range of transmission states, and associated with a second color, the second color having a low b* characteristic value.

In some embodiments, each of the first and second transmission states may admit about 60% or more visible light through the electrochromic device. Additionally, about 5% less visible light may be transmitted through the electrochromic device when operating in the second transmission state than is transmitted when operating in the first transmission state. The difference between the b* characteristic values of the first color and the second color may be about 4.5 or more. The difference between the first color and the second color in L*a*b* color space may be about 5 or more.

In yet other embodiments, a method for controlling transmissivity in an electrochromic device may include receiving an illuminance input indicating an amount of illuminance in a space, receiving a solar heat input indicating whether it is desired to warm or cool the space, and determining a range of transmission states for which the amount of illuminance in the space is within a threshold amount from a desired amount of illuminance. When it is desired to warm the space, the method may include setting the electrochromic device to a first transmission state within the determined range of transmission states and having a first solar heat gain coefficient.

When it is desired to cool the space, the method may include setting the electrochromic device to a second transmission state, also within the determined range of transmission states, having a second solar heat gain coefficient that is less than the first solar heat gain coefficient.

The first and second transmission states preferably have a transmissivity of about 60% or greater. The visible light transmittance of the electrochromic device when operating in the second transmission state is preferably about 5% lower than when operating in the first transmission state. The first solar heat gain coefficient is preferably between about 15% to about 25% greater than the second solar heat gain coefficient.

Also in some embodiments, the method may include receiving a vacancy input indicating whether the space is vacant and, when the space is vacant and solar heat is not desired to be transmitted through the electrochromic device, setting the electrochromic device to a third transmission state having a transmissivity less than either of the first transmission state and the second transmission state. The vacancy input may, in some embodiments, be received from at least one of a building maintenance system and an occupancy sensor.

In other embodiments, a method for controlling transmissivity in an electrochromic device includes receiving a color input indicating whether it is acceptable for the electrochromic device to be set to a color having a high b* characteristic value, and receiving a solar heat input indicating whether it is desired to warm or cool the space. In some embodiments, if the color input indicates that it is acceptable for the electrochromic device to be set to a color having a high b* characteristic value and the solar heat input indicates that it is desired to warm the space, the method may include setting the electrochromic device to a first transmission state having a high infrared radiation transmittance and high b* characteristic value. In some embodiments, if the color input indicates that it is not acceptable for the electrochromic device to be set to a color having a high b* characteristic value and the solar heat input indicates that it is desired to warm the space, the method may include setting the electrochromic device to a second transmission state having a low infrared radiation transmittance and low b* characteristic value. Also in some embodiments, if the solar heat input indicates that it is desired to cool the space, the method may include setting the electrochromic device to the second transmission state.

In some embodiments, the difference between the transmissivity of the electrochromic device in each of the first transmission state and the second transmission state may be about 5% or less. Both the first transmission state and the second transmission state may transmit at least about 60% of visible light through the electrochromic device. In some embodiments, the solar heat gain coefficient of the first transmission state may be between about 15% to about 25% greater than the solar heat gain coefficient of the second transmission state. Both the first transmission state and the second transmission state may have a solar heat gain coefficient between about 0.4 and about 0.55. The distance between the color of the electrochromic device in the first transmission state and in the second transmission state as measured in L*a*b* color space is at least about 5. In some embodiments, the distance between the b* characteristic value of the color of the electrochromic device in the first transmission state and the b* characteristic value of the color of the electrochromic device in the second transmission state as measured in L*a*b* color space is at least about 4.5. In some embodiments, both the first transmission state and the second transmission state may have a b* characteristic value about 8 or greater.

In yet other embodiments, a method for controlling transmissivity in an electrochromic device may include receiving each of an occupancy input, a solar heat input, an illuminance input and a solar glare input, the occupancy input indicating whether a space associated with the electrochromic device is vacant or occupied, the solar heat input indicating whether it is desired to warm or cool the space, the illuminance input indicating whether there is an excess of daylight in the space, and the solar glare input indicating whether there is an excess of glare in the space. In some embodiments, the method may also include determining, based at least in part on the occupancy input, whether the space is vacant or occupied. In some embodiments, if the space is vacant, the method may include determining whether it is desired to warm or cool the space. In some embodiments, if it is desired to warm the space, the method may include setting the electrochromic device to a first transmission state having a high transmissivity and high solar heat gain coefficient. In some embodiments, a high transmissivity may correspond to any transmissive state at which about 50% or more visible light is transmitted through the device. In some embodiments, if it is desired to cool the space, the method may include setting the electrochromic device to a transmission state having a low transmissivity for blocking solar heat. In some embodiments, a low transmissivity may correspond to any transmissive state at which about 25% or less visible light is transmitted through the device. In some embodiments, if the space is occupied, the method may include determining whether there is an excess of daylight in the space. In some embodiments, if there is an excess of daylight in the interior space, the method may include determining whether there is an excess of glare in the space. In some embodiments, if there is an excess of glare in the space, the method may include setting the electrochromic device to a transmission state having a low transmissivity for blocking excess glare. In some embodiments, if there is not an excess of glare in the space, the method may include setting the electrochromic device to a transmission state yielding an illuminance for which there is not an excess of daylight in the space. In some embodiments, if there is not an excess of daylight in the space, the method may include determining whether it is desired to warm or cool the space. In some embodiments, if it is desired to warm the space, the method may include setting the electrochromic device to the first transmission state. In some embodiments, if it is desired to cool the space, the method may include setting the electrochromic device to a transmission state having a high transmissivity and low solar heat gain coefficient.

BRIEF DESCRIPTION OF THE DRAWINGS

FIG. 7 is a diagram in accordance with an aspect of the disclosure.

FIG. 8 is a diagram in accordance with an aspect of the disclosure.

DETAILED DESCRIPTION

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present disclosure is defined by the appended claims and equivalents.

Figure 2:
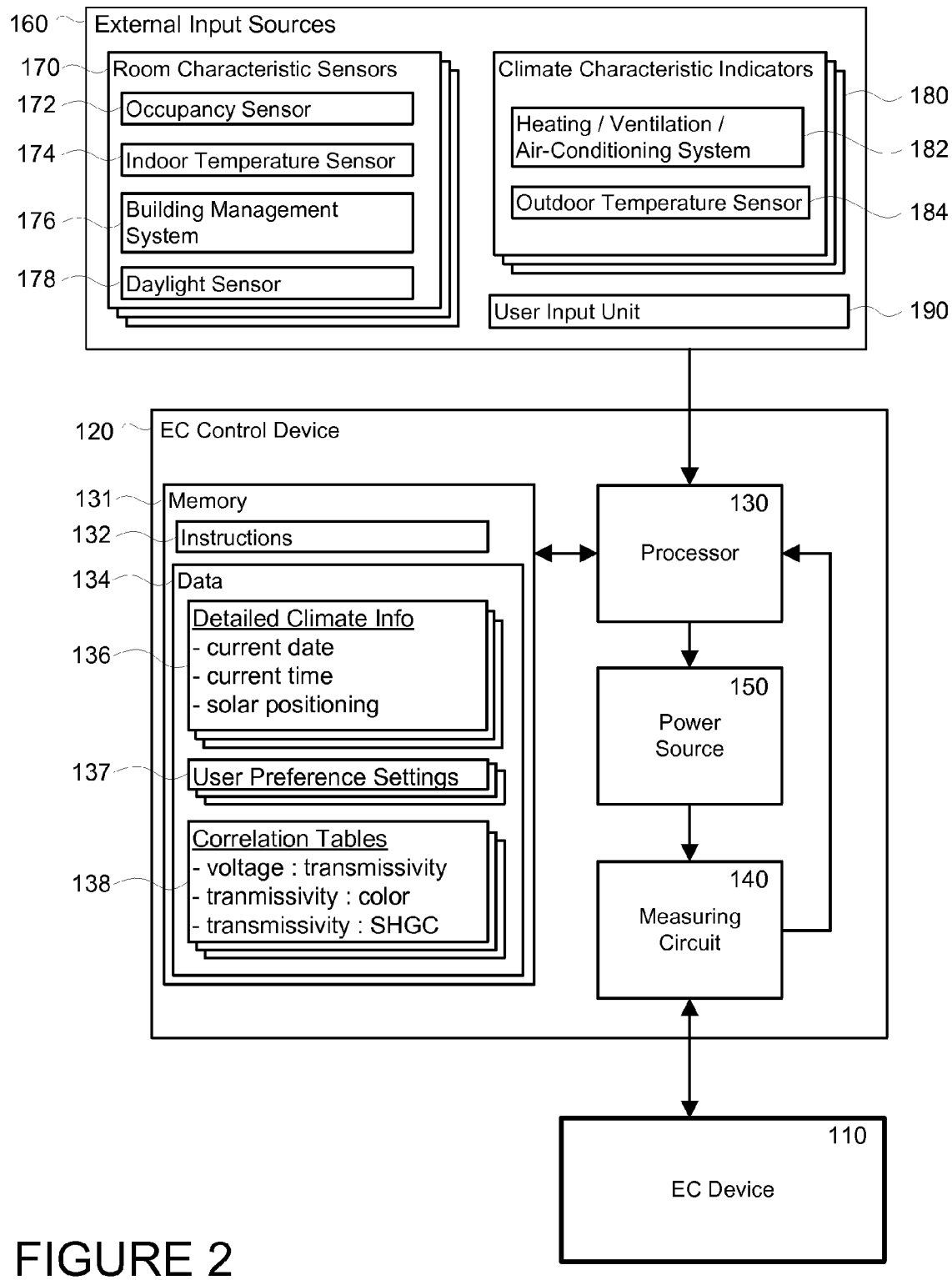
FIG. 2 is a functional block diagram of a system in accordance with an aspect of the disclosure.

FIG. 2 is a functional block diagram of a system 100 in accordance with aspects of the disclosure. The system 100 may include an electrochromic or photochromic device 110, an electrochromic device control unit 120, and one or more external input sources 160.

The system 100 of FIG. 2 may be applied to any space associated with the electrochromic device 110. The space associated with the electrochromic device may be an interior space, such as a room in a house, an office in a building, or a vehicle (e.g., car, airplane) interior. The electrochromic device 110 may separate such an interior space from an outdoor environment. Varying transmissivity of the electrochromic device may, for example, control an amount of sunlight and/or heat that passes from the outdoor environment through to the interior space.

Figure 1A:
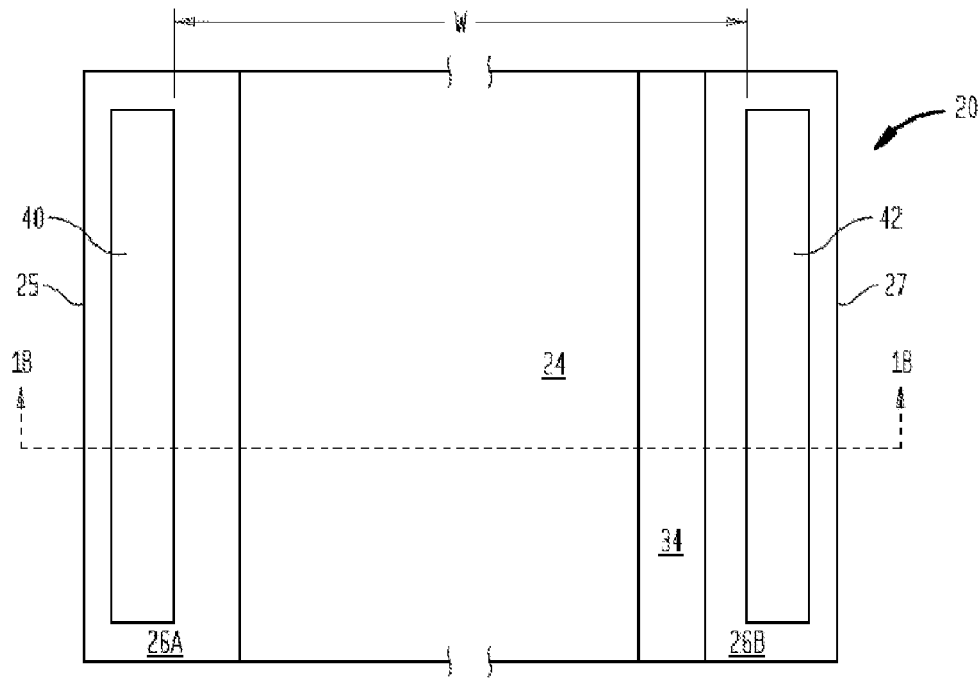
FIG. 1A is a top plan view of an electrochromic device.
Figure 1B:
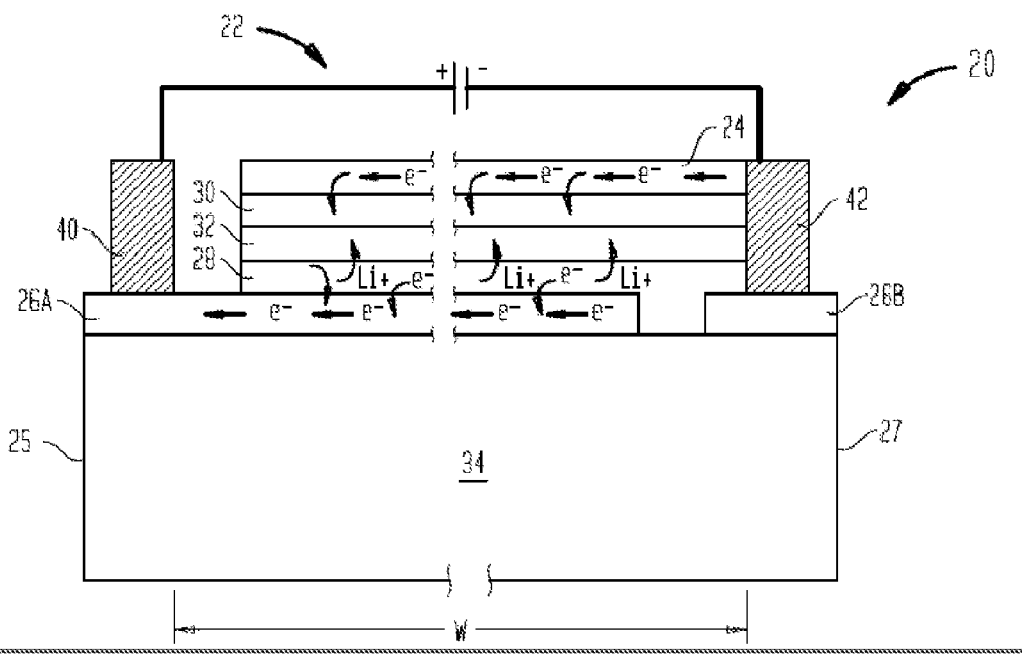
FIG. 1B is a view of the electrochromic device of FIG. 1A at cross-sectional line 1B

The electrochromic device 110 may be any device having a variable transmissivity controlled by an electrical input. For example, the electrochromic device 110 may be an insulated glass unit with a structure similar to that described in FIG. 1. Furthermore, the electrochromic device 110 is not limited to a device having a single pane but rather can be a device having one or more panes, each pane controlled by the system 100.

The electrochromic device control unit 120 may include a processor 130, measuring device 140, and power source 150. The processor 130 may be any conventional processor, including but not limited to commercially available CPUs. Alternatively, the processor 130 may be a dedicated device such as an ASIC or other hardware-based processor. The memory 131 may store information accessible by processor 130, including instructions 132 that may be executed by the processor 130, and data 134.

The instructions 132 may be any set of instructions to be executed by the processor 130. For example, the instructions may be stored as computer code on the computer-readable medium. In that regard, the terms "instructions" and "programs" may be used interchangeably herein. Functions, methods, and routines of the instructions are explained in more detail below.

The data 134 may be retrieved, stored or modified by processor 120 in accordance with the instructions 132. The data may comprise any information sufficient to identify the relevant information, including, without limitation, numbers, descriptive text, proprietary codes or information that is used by a function to calculate the relevant data. The data may also be formatted in any computer-readable format.

The data 134 may include data that is consistently being obtained and updated. For example, the data 134 may include climate information 136 (including, for example, temperature, humidity, UV index, etc.), indicating a current date, a current time of day, and/or a current solar position (e.g., mapping the position of the Sun given a certain date and time of day). Storing information regarding the current solar position may be useful for determining whether the interior space is receiving, e.g., excess solar glare, an excess of incident solar radiation.

The data 134 may also include data that was obtained at a previous point in time and is regularly updatable. For example, the data may include user preference data 137, indicating a user's preference for operation of the electrochromic device control unit 120. In one example, described in greater detail below, the user preference data may include a lightest color input, indicating a lightest color at which a user will still tolerate the appearance of the electrochromic device 110. In other examples, the user preference data may indicate different desired parameters of the electrochromic device, including, without limitation, a minimum transmissivity setting, a heating setting, and a cooling setting. Some of these parameters and settings will be described in greater detail below.

The data 134 may further include information that was obtained at a previous point in time and is expected to persist over time. For example, the data may include correlation information indicating correlations between various measurable parameters of the electrochromic device. The correlation information may be stored in the memory as, for example, tables 138, and may be used by the processor to determine a particular characteristic of the electrochromic device 110 given a known measurement of another characteristic.

Figure 3A:
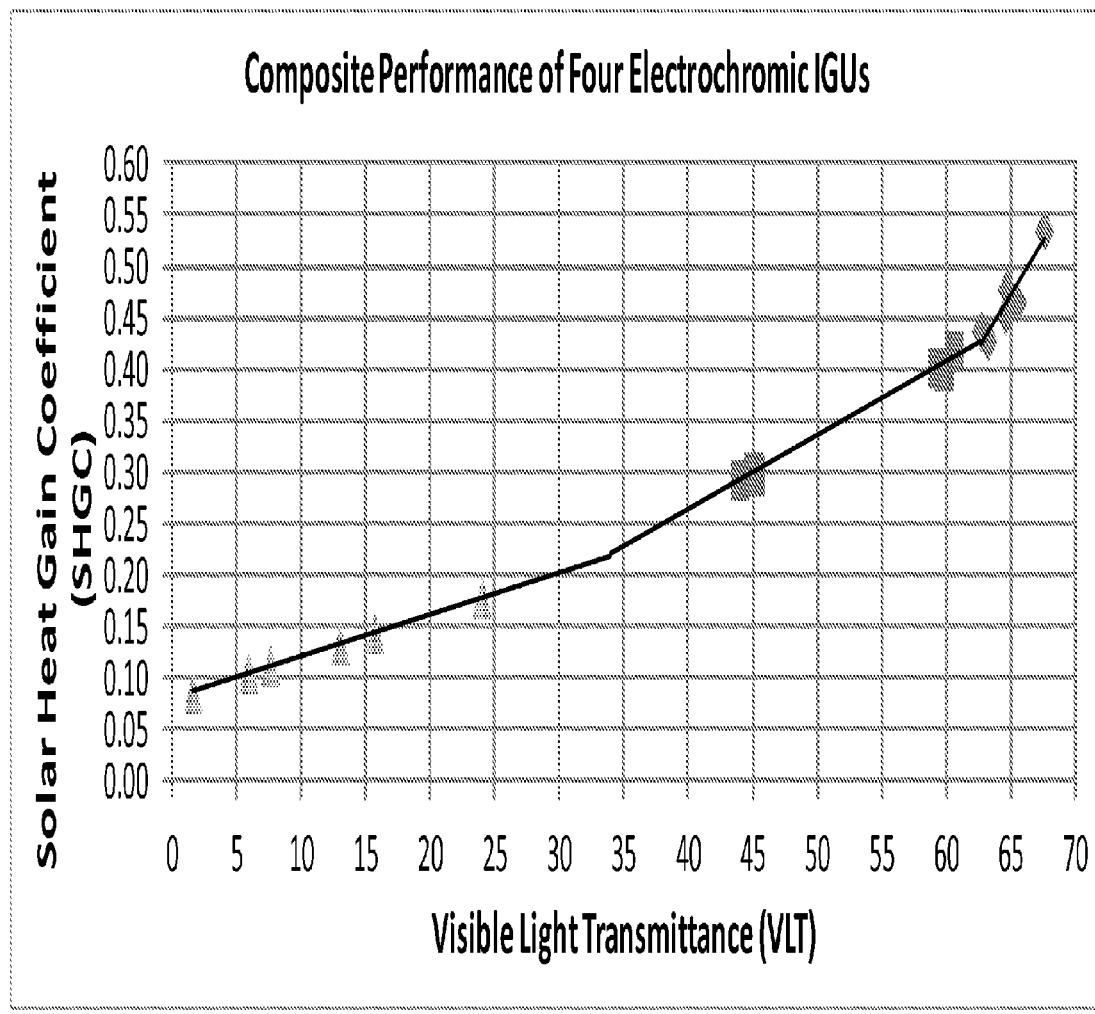
FIGS. 3A and 3B are graphs in accordance with an aspect of the disclosure.
Figure 3B:
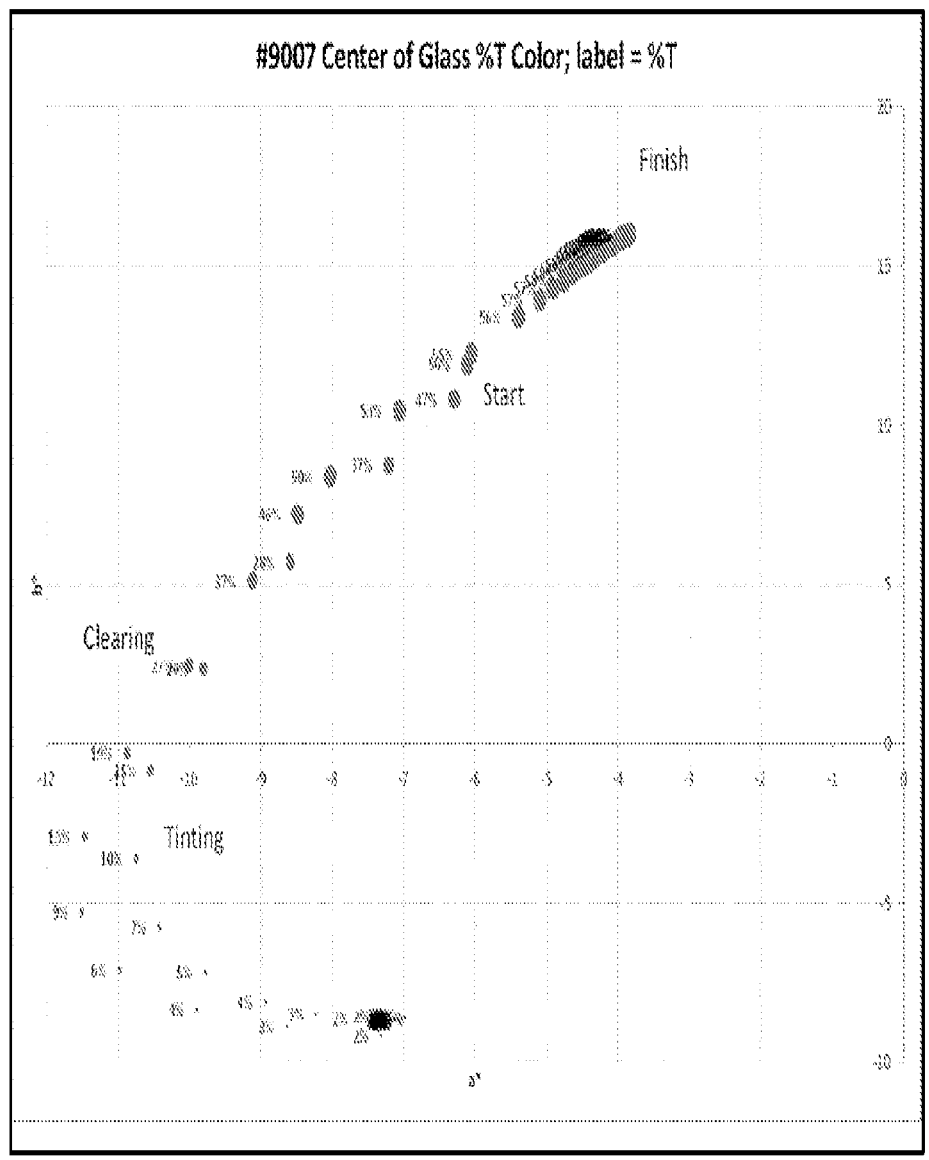

FIGS. 3A and 3B illustrate correlated parameters of an example electrochromic device. In FIG. 3A, a transmissivity of the example electrochromic device is correlated with a solar heat gain coefficient for all possible transmissivities. The transmissivity may be quantitatively assessed, for example, as a percentage, indicating a percentage drop in lux (total lumens per the cross-sectional area of the electrochromic device) between two glass frames on opposite ends of the electrochromic device. This assessment may be used to indicate a percentage of visible light transmitted through the electrochromic device. The solar heat gain coefficient (SHGC) may be quantitatively assessed based on near-infrared transmittance (e.g., a percentage of infrared radiation transmitted through the electrochromic device 110). In the example of FIG. 3A, if the transmissivity across the example electrochromic device were measured, the processor may determine the then-present solar heat gain coefficient of the example electrochromic device. For instance, a transmissivity of about 45% may correlate to a solar heat gain coefficient of about 0.30.

Utilization of the correlation table of FIG. 3A may be especially beneficial for achieving two different transmission states with substantially similar transmissivities but substantially different SHGC. For example, the electrochromic device 110 may be controlled to one of a first state having a transmissivity of about 60% and about 0.40 SHGC and a second state having a transmissivity of about 65% and about 0.47 SHGC. The difference in illumination between these two states may be barely perceptible to an occupant of the interior space, yet with, for example, an about 15% change in solar heat gain. As a further example, the electrochromic device 110 may be controlled to one of a first state having a transmissivity of about 62% and about 0.43 SHGC and a second state having a transmissivity of about 67% and about 0.53 SHGC. Again, the difference in illumination between these two states may be barely perceptible to an occupant of the interior space, yet with, for example, an about 25% change in solar heat gain.

In FIG. 3B, the transmissivity of the example electrochromic device is correlated with a color for all possible transmissivities. The color may be quantitatively assessed according to CIE L*a*b* color space, which is a perceptually uniform transformation of color space, measuring both an a* characteristic (e.g., a measure of redness versus greenness) and a b* characteristic (e.g., a measure of blueness versus yellowness) for any given color of the electrochromic device. In the example of FIG. 3B, if the transmissivity across the example electrochromic device were measured, the processor may determine the then-present color of the example electrochromic device. For instance, a transmissivity of about 50% may correlate to a color of (−8,8). Meanwhile, a transmissivity of 100% (fully clear state) may correlate to a color of (−4, 16).

Utilization of the correlation table of FIG. 3B may be especially beneficial for maintaining the electrochromic device at a relatively clear transmissivity without reaching a fully clear state. For example, the electrochromic device 110 may be controlled to one of a first state having a transmissivity of about 50% and a color of about (−8, 8), and a second state having a transmissivity of about 55% and a color of about (−6, 12.5). The difference in illumination between these two states may be barely perceptible to an occupant of the interior space, yet with, for example, with a difference in color of about 5 (as measured by the distance between the two colors in L*a*b* space) and a difference in b* characteristic of about 4.5.

The electrochromic control device 120 may include other correlation tables 138 in addition to the tables shown in FIGS. 3A and 3B. For example, another correlation table may provide a correlation between a voltage across the electrochromic device 110 and a transmissivity. Another correlation table may provide a correlation between voltage and color. As mentioned above, these tables 138 may be determined in advance of operation of the device and stored within the memory 131. In other examples where more than one characteristic of the electrochromic device 110 may be measured by the electrochromic device control unit 120, these tables 138 may be updated regularly according to the up-to-date measurements.

One benefit of including the correlation tables 138 in the data 134 is that the correlation tables 138 enable the processor 130 to determine a desired operation state of the electrochromic device 110 based on otherwise immeasurable information. For example, the system 100 may not include an infrared sensor, temperature sensor, or other device capable of measuring solar heat gain. However, by including a correlation table 138 correlating a solar heat gain coefficient to a voltage or transmissivity characteristic of the electrochromic device 110, the electrochromic control device 120 may effectively measure the SHGC of the electrochromic device 110. In another example, the system 100 may not include a sensor or device capable of measuring the color of the electrochromic device 110. Again, by including a correlation table 138 correlating a color to a voltage or transmissivity of the electrochromic device 110, the electrochromic control device 120 may effectively measure the color of the electrochromic device 110.

Storage of multiple correlation tables 138 is especially beneficial where the electrochromic device 110 may be set to one or more states for which one characteristic is considerably similar yet another characteristic is considerably different. For example, two transmission states of the electrochromic device 110 may have considerably similar transmissivities yet considerably different SHGC. In such an example, a table correlating voltage to SHGC may be utilized to differentiate between the two transmission states.

Returning to FIG. 2, the measuring device 140 may be capable of measuring electrical properties of the electrochromic device 110. In one example, the measuring device 140 may include a voltage measuring circuit for measuring a difference in electric potential between the first terminal and the second terminal of the electrochromic device 110. In another example, the measuring device 140 may include a current measuring circuit for measuring an amount of current flowing through the electrochromatic device 110, such as an amount of current at the first terminal or at the second terminal. In one example, the measuring circuit may monitor properties of the electrochromic device 110, such as temperature of the electrochromic device 110 and bleaching/coloring history, as described in U.S. Pat. No. 7,133,181 ("Control System for Electrochromic Devices"), the disclosure of which is hereby included herein in its entirety. In another example, the measuring circuit may be part of an identification circuit, as described in co-pending application Ser. No. 13/435,719, the disclosure of which is also hereby included herein in its entirety.

The measuring device 140 may be coupled to the processor 130 in order to relay the detected voltage and/or current characteristics of the electrochromic device to the processor 130. These characteristics may in turn indicate to the processor 130 the then-present transmissivity, color, and/or solar heat gain characteristics of the electrochromic device, based on the stored correlation tables 138, as described above.

The power source 150 may be any variable voltage source known in the art, including, without limitation, a switching buck voltage converter or digital-to-analog (DAC) converter with a linear power amplifier. The power source 150 may be capable of controlling the operation of the electrochromic device 110. For example, the power source 150 may supply an amount of voltage or current to the electrochromic device 110 according to instructions received from the processor 130. Additionally, the power supply may vary the amount and/or polarity of the supplied voltage based on the instructions received from the processor.

The power source 150 may be coupled to the processor 130 in order receive instructions regarding operation of the electrochromic device 110. For example, if the processor 130 determines to reduce the transmissivity of the electrochromic device 110, the power source 150 may receive an instruction to increase the power supplied to the electrochromic device 110. Alternatively, if the processor 130 determines to increase the transmissivity of the electrochromic device 110, the power source 150 may receive an instruction to decrease the power supplied to the electrochromic device 110.

The external input sources 160 may provide information to the processor 130 regarding proper control of the electrochromic device 110. The external input sources 160 may include several room characteristic sensors 170, including but not limited to an occupancy sensor 172, an indoor temperature sensor 174, a Building Management System (BMS) 176, and a daylight sensor 178. These sensors may provide the electrochromic device control unit 120 with information necessary to determine a proper state of operation for the electrochromic device. For example, the occupancy sensor 172 may provide information indicating whether a room in which the electrochromic device is located is currently in use.

In some examples, it may be desirable to operate the electrochromic device differently depending on whether the room is in use or not. For further example, the indoor temperature sensor 174 may provide information indicating whether the room's current temperature is suitable for occupation. Similarly, the BMS may provide an input indicating when lights in the room are scheduled to automatically turn on or off, indicating the room's standard hours of operation. The BMS may also provide an input indicating hours for automatically enabling and disabling a security system of a building in which the electrochromic device is located, similarly indicating the building's standard hours of operation.

The daylight sensor 178 may measure an amount of brightness in a room, indicating a transmissivity percentage value of the electrochromic device (e.g., the brighter the room, the more transmissive the device). Collectively, these inputs may be useful for determining whether it is desirable that the electrochromic device 110 be operated at a lowest possible cost (highest energy efficiency), for instance in such cases when the room is determined to be vacant, and/or when it is desirable that the electrochromic device 110 be operated to make occupation of the room comfortable.

The external input sources 160 may also include climate characteristic indicators and sensors 180, including but not limited to a Heating Ventilation and Air-Conditioning (HVAC) system 182, and an outdoor temperature sensor 184. The HVAC system 182 may provide inputs relating to climate control of a room in which the electrochromic device 110 is located (e.g., heating the room, cooling the room, etc.). The outdoor temperature sensor, similarly, may provide inputs indicating the temperature of an outdoor location.

A user control unit 190 may provide additional inputs indicating preferences regarding operation of the electrochromic device 110. The user control unit may include a user interface for inputting these preferences. Preferences may include a maximum transmissivity input, a minimum transmissivity setting, a heating setting, a cooling setting, and user override inputs, overriding inputs received from the external input sources 160. Preferences may also include, without limitation, an input indicating any one of a desired brightness of the space, solar angles likely to cause glare and threshold light levels at which glare might be a problem.

The external input sources 160 are not limited to the above described sensors and inputs, but may include any sensor or input useful for identifying either a characteristic of the electrochromic device, a characteristic of the interior space, or an energy management preference. Furthermore, each of the specified external input sources 160 may be utilized for purposes in addition to those described above. For example, the HVAC system may provide BMS-type inputs, including a time of day. For further example, the user control unit 190 may provide occupancy sensor-type information, including current usage of an interior space.

As described above, controlling one characteristic of the electrochromic device 110 does not necessarily have a proportionate effect on another aspect of the device 110. For instance, a small variance in the transmissivity of the electrochromic device 110 may have a disproportionately large effect on the variance of color of the electrochromic device 110. In another example, a small variance in transmissivity may have a disproportionately large effect on solar heat passing through the device 110. For these reasons, it is especially beneficial to be able to control the electrochromic device 110 based not only on a desired transmissivity but also on additional characteristics, such as color and/or solar heat gain.

For example, the electrochromic device 110 may feature two transmission states exhibiting a nearly identical transmissivity but a considerably different color. In such a case, adjusting the color of the electrochromic device 110 between these two transmission states may have a negligible effect on the brightness of the interior space while having a considerable effect on the color of the electrochromic device. Thus, the color of the electrochromic device 110 may be darkened without sacrificing the brightness or dimness of the interior space.

Controlling the color of the electrochromic device may be beneficial for maintaining a pleasing appearance to the electrochromic device. For instance, setting the electrochromic device to a transmission state having a high transmissivity (e.g., a transmission state in which more than 50%, or alternatively about 50% or more, visible light is transmitted through the device) may cause the device to appear an unpleasant yellowish color. By controlling the color of the electrochromic device at even transmission states having a high transmissivity, a user may set the electrochromic device to a transmission state having a high level of transmissivity while also maintaining a more aesthetically desirable tint or color, e.g., a color that does not appear yellow. In other instances, setting the electrochromic device to a transmission state having a tinted color may reduce overall visibility through the device. At some times (e.g., at night, when the device's yellow appearance may be less noticeable) it may be preferable to maintain the electrochromic device at a transmission state having a high transmissivity despite the device's yellow appearance. Thus, by way of example, a user may set the electrochromic device to a transmission state having the same level of transmissivity while also controlling the color of the device.

Similarly, the electrochromic device 110 may feature two transmission states exhibiting a nearly identical transmissivity but a considerably different SHGC. By adjusting the SHGC of the electrochromic device, the electrochromic control device 120 may efficiently manage climate control of the indoor space, permitting solar heat to warm the indoor space during heating seasons (e.g., winter), and blocking solar heat from warming the indoor space during cooling seasons (e.g., summer). Thus, the electrochromic control device 120 may efficiently control heating and cooling of the indoor space by adjusting the SHGC of the electrochromic device without sacrificing the perceived brightness or perceived dimness of the interior space.

Operations in accordance with controlling transmissivity of the electrochromic device in conjunction with these additional characteristics will now be described. It should be understood that the following operations do not have to be performed in the precise order described below. Rather, various operations can be handled in a different order or simultaneously. It should also be understood that these operations do not have to be performed all at once. For instance, some operations may be performed separately from other operations. Moreover, operations may be added or omitted.

Figure 4:
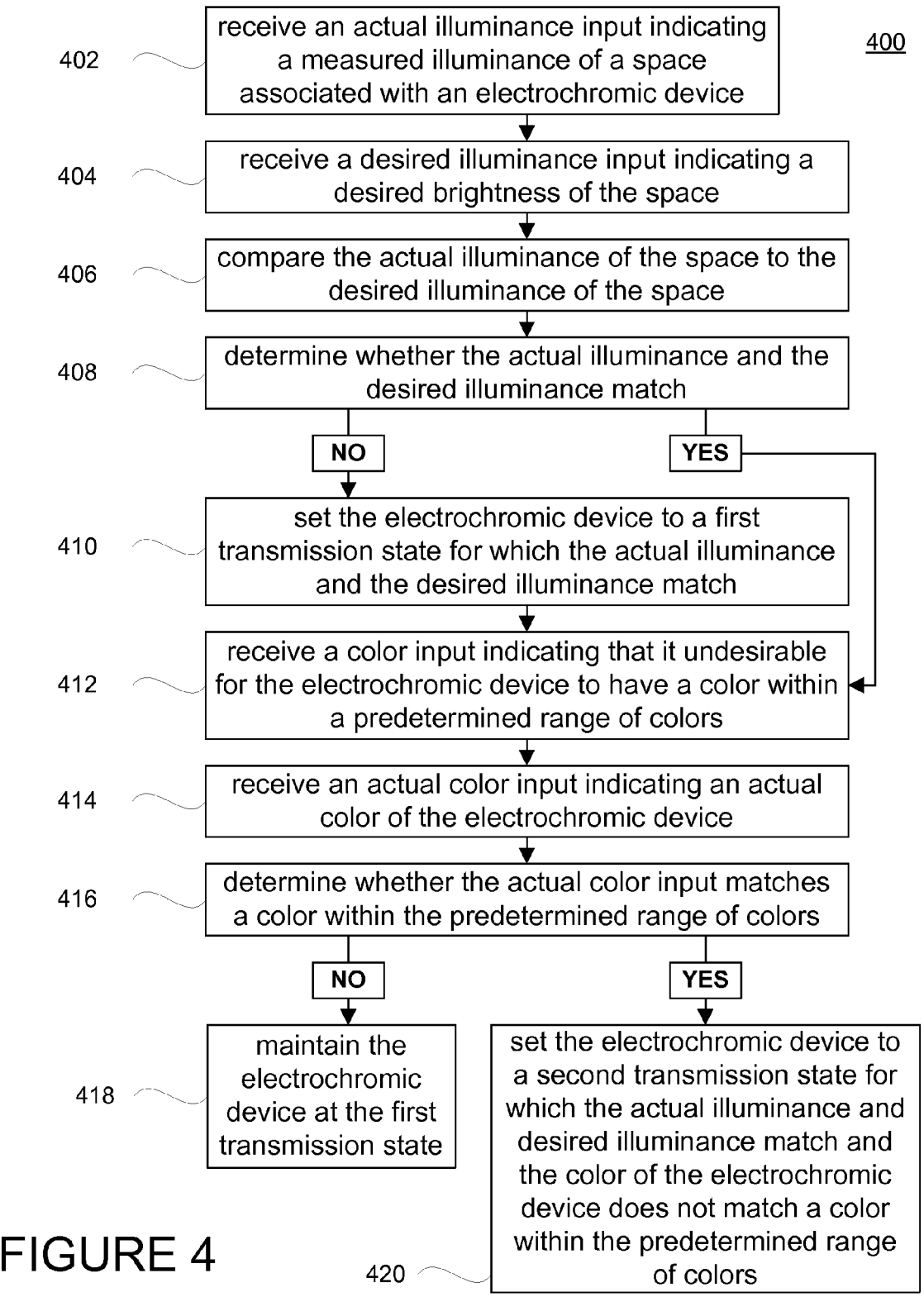
FIG. 4 is a flow diagram in accordance with an aspect of the disclosure.

FIG. 4 is a flow diagram depicting operations 400 for controlling a transmissivity of the electrochromic device in conjunction with color. In block 402, the electrochromic control device 120 may receive an actual illuminance input, indicating a measured illuminance (for example, in lux) of a space associated with the electrochromic device. The measured illuminance may be based on a measurement of a photosensor (e.g., daylight sensor) 188 positioned within an interior space associated with the electrochromic device. In some examples, the actual illuminance input may indicate the measured illuminance for only a portion of the interior space. In such examples, the measured portion of the interior space may be considered representative of the brightness of the entire interior space. In other examples, one or more daylight sensors 172 may be stationed within the interior space. Each sensor may collect information regarding the brightness of its respective portion of the interior space. The illuminance measured by each sensor may then be sent to the controller, where said measurements may be combined to yield a measurement of the overall illuminance of the interior space. In one example, the illuminance measured by each of the daylight sensors may be averaged to yield an average illuminance of the interior space. In another example, the illuminance measured by each of the daylight sensors may be assigned a weight (e.g., assigning a greater weight to a measurement taken by a daylight sensor in the center of the interior space than to a measurement taken by a daylight sensor in a corner of the interior space), and then combined to yield a weighted average illuminance of the interior space.

In block 404, the electrochromic control device 120 may also receive a desired illuminance input, indicating a desired brightness of the space. In one example, this information may be manually inputted by an occupant of the space or other user of the system 100. In another example, this information may be predetermined and stored in the memory 132 of the processor 130. In other examples, the processor 130 may store a default value which may be modified by a manual input.

In block 406, the electrochromic control device 120 may compare the actual illuminance of the space to the desired illuminance of the space. This may be accomplished, for instance, by calculating a difference between the actual illuminance input and the desired illuminance input (which may both be measured in lux, resulting in the calculated difference between the inputs also being measured in lux).

In block 408, the electrochromic control device 120 may determine whether the actual illuminance and the desired illuminance sufficiently match. For example, the electrochromic control device 120 may compare the calculated difference between the actual illuminance and the desired illuminance to a threshold value. In one such example, the threshold value may correspond to a margin of error within which the daylight sensor 172 can accurately measure the brightness of the interior space. Any brightness measured by the daylight sensor 188 within a threshold value of the desired brightness would thus be considered to sufficiently match the desired brightness. In another example, the threshold value may correspond to a tolerable amount of difference between the desired brightness of the interior space and the actual brightness of the interior space (e.g., the desired brightness is within 20% of the actual brightness). In other words, although an occupant of the interior space may desire the interior space to be illuminated to a particular brightness, the occupant may find a space slightly brighter or dimmer to be tolerable. In this example, any brightness measured by the daylight sensor 188 within a threshold value of the desired brightness would be tolerable to an occupant of the interior space, and would therefore be considered to sufficiently match the desired brightness.

If it is determined that the actual illuminance and the desired illuminance sufficiently match, operations 400 may continue in block 412, described below. If, however, it is determined that the actual illuminance and the desired illuminance do not sufficiently match, then operations continue in block 410 where the electrochromic control device 120 may set the electrochromic device 110 to a first transmission state for which the actual illuminance and the desired illuminance sufficiently match. For example, the processor 130 may relay instructions to the power source 150 to increase or decrease a supplied amount of power to the electrochromic device 110. When the desired illuminance is greater than the actual illuminance by more than the threshold value (e.g., an occupant of the interior space desires the space to be brighter), the electrochromic control device 120 may adjust the voltage across the electrochromic device 110 to raise the transmissivity of the electrochromic device 110. When the desired illuminance is less than the actual illuminance by more than the threshold value (e.g., an occupant of the interior space desires the space to be dimmer), the electrochromic control device 120 may adjust the voltage across the electrochromic device 110 to lower the transmissivity of the device.

In block 412, the electrochromic control device 120 may receive a color input indicating that it is undesirable for the electrochromic device 110 to have a color within a predetermined range of colors. In one example, the color input may be a user preference provided from the user control unit 190. For instance, a user of the interior space may prefer that the electrochromic device not have a yellowish appearance and may enter a user input indicating that the electrochromic device should not have a yellowish color. In such an example, the predetermined range of colors may be a range of colors having a yellowish appearance.

In another example, the electrochromic control device may receive a color input from its own memory 134. For example, the memory 134 may include an internal clock that may indicate a time of day (e.g., daytime, nighttime). In such an example, the time of day may indicate to the electrochromic control device 120 whether it is undesirable for the electrochromic device 110 to have a yellowish appearance (e.g., tinted during daylight hours) or whether a yellowish appearance is tolerated (e.g., clear during night hours to increase visibility through the electrochromic device regardless of the device's appearance).

In block 414, the electrochromic control device 120 may receive an actual color input, indicating an actual color of the electrochromic device. Receiving the actual color input may involve measuring a different characteristic of the electrochromic device 110 and correlating the measured characteristic to an actual color of the device. For example, the electrochromic control device 120 may measure the transmissivity or a voltage of the electrochromic device 110 using the measuring device 140, and may then correlate the measured voltage to a correlative color using the correlation tables 138.

In block 416, the electrochromic control device 120 may determine whether the actual color input sufficiently matches a color with the predetermined range of colors. If the color input indicates that it is desired that the electrochromic device not have a color within a range of undesired colors, then operations may continue in block 418, where the electrochromic control device 120 may maintain the electrochromic device 110 at the first transmission state. If the color input indicates that it is acceptable for the electrochromic device to have a color within a range of undesired colors, then operations may continue in block 420, where the electrochromic control device 120 may set the electrochromic device 110 to a second transmission state for which the actual illuminance and desired illuminance still sufficiently match and the color of the electrochromic device does not sufficiently match a color within the predetermined range of colors.

The operations described in flow chart 400 are especially useful in controlling operation of an electrochromic device that is operable in more than one transmission state for which the actual illuminance sufficiently matches the desired illuminance, with one transmission state having a color within the predetermined range of colors and another transmission state having a color not within the predetermined range of colors.

Figure 5:
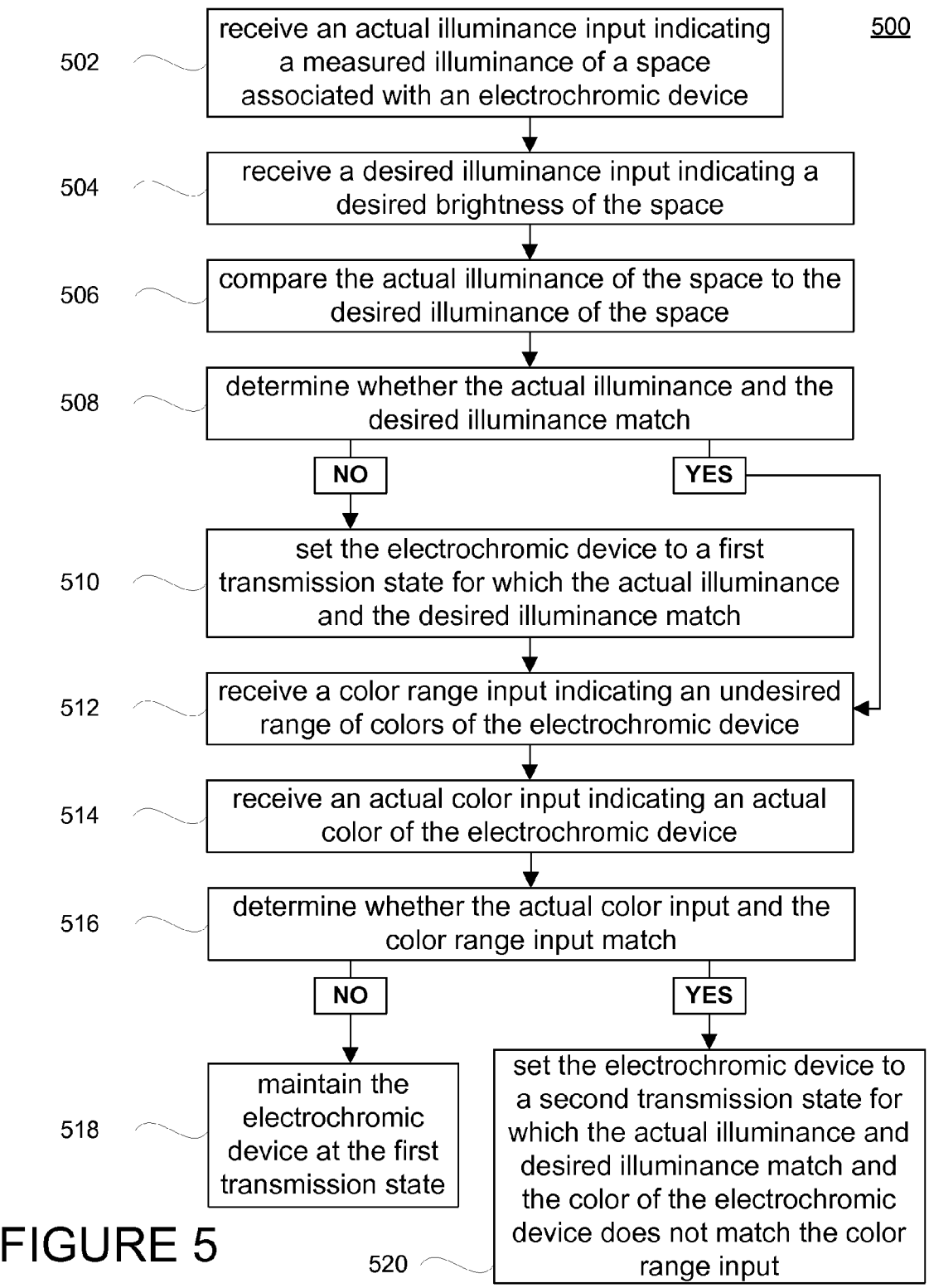
FIG. 5 is a flow diagram in accordance with an aspect of the disclosure.

The color input may be quantified according to a color map, such as the CIE L*a*b* color space described above. For example, the color input may indicate that it is undesirable for the electrochromic device to operate at a transmission state having a color that has a b* characteristic of greater than about 10 or 12. Alternatively, the color input may be quantified according to the colors' peak wavelengths on a visible light spectrum. For example, the color input may indicate that it is undesirable for the electrochromic device to operate at a color that has a peak wavelength of between about 560 nm and about 595 nm While the range of colors in the flow diagram of FIG. 4 is predetermined, in other examples, the range of colors may be selected by a user. FIG. 5 is an example flow diagram 500 for operation of the electrochromic device in which the range of colors is selected by a user. Blocks 502 through 510 are steps identical or similar to those described in relation to blocks 402 through 410 respectively. In these steps, the electrochromic control device 120 may gather information regarding an actual illuminance and a desired illuminance of a space, compare the gathered information, adjust the electrochromic device in order to sufficiently match the actual illuminance and the desired illuminance.

In block 512, the electrochromic control device may receive a color range input indicating a desired range of colors of the electrochromic device 110. For example, the electrochromic control device 120 may receive a value indicating a lightest tolerable color of the electrochromic device 110 (e.g., the most yellowish color that a user will tolerate). In such an example, the value may indicate that the electrochromic device 110 should not operate at a transmission state for which the electrochromic device is a color lighter than the inputted value.

In block 514, the electrochromic control device 120 may receive an actual color input indicating an actual color of the electrochromic device 110. Receiving the actual color input may involve measuring a different characteristic of the electrochromic device 110 and correlating the measured characteristic to an actual color of the device. For example, the electrochromic control device 120 may measure the transmissivity or a voltage of the electrochromic device 110 using the measuring device 140, and may then correlate the measured voltage to a correlative color using the correlation tables 138.

In block 516, the electrochromic control device may determine whether the actual color input and the color range input sufficiently match. This may involve determining whether the actual color input is within the range specified by the color range input. For example, if the color input specified a value corresponding to a lightest tolerable color, the electrochromic control device 120 may determine whether the lightest tolerable color is lighter than or equal to the actual color of the electrochromic device.

If the electrochromic control device determines that the actual color input and the color range input do not sufficiently match, then operations may continue in block 518 where the electrochromic control device may maintain the electrochromic device 110 at the first transmission state. If the electrochromic control device 120 determines that the actual color input and the color range input do not sufficiently match, then operations may continue in block 520, in which the electrochromic control device may set the electrochromic device to a second transmission state for which the actual illuminance and the desired illuminance sufficiently match and the color of the electrochromic device does not sufficiently match the color range input. For example, if the color range input specifies a lightest tolerable color and the actual color input is a color lighter than the lightest tolerable color, then the electrochromic control device 120 may adjust the transmissivity of the electrochromic device until the color of the electrochromic device sufficiently matches or is darker than the lightest tolerable color. Adjusting the transmissivity of the electrochromic device may involve increasing or decreasing a voltage supplied to the device such that the color of the device will change in a desired manner.

Figure 6:
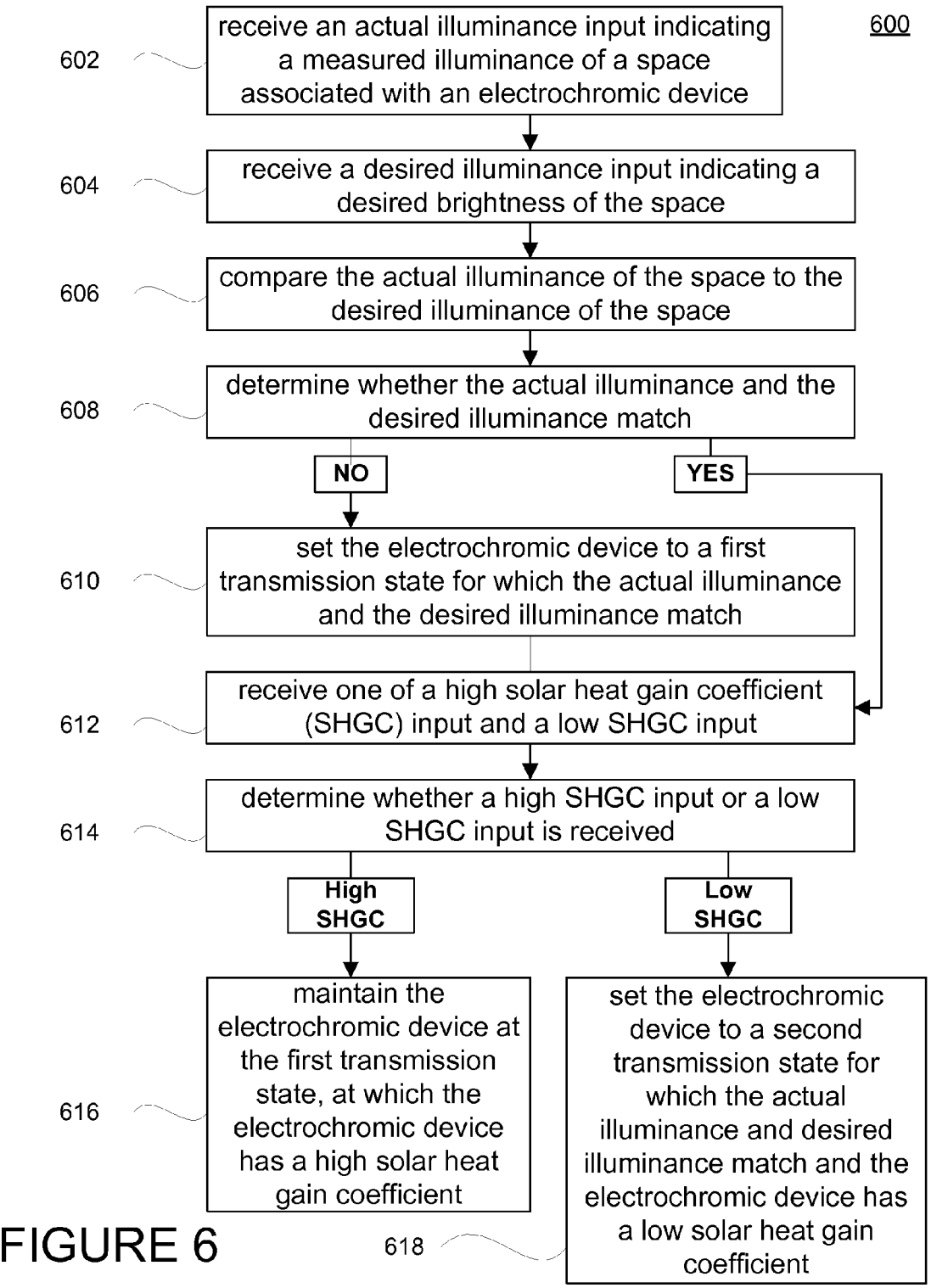
FIG. 6 is a flow diagram in accordance with an aspect of the disclosure.

Similar operations may be employed for controlling an amount of infrared radiation transmitted through the electrochromic device. For example, in FIG. 6, flow diagram 600 depicts a method of controlling transmittance of infrared radiation in accordance with an aspect of the disclosure. Blocks 602 through 610 are steps identical or similar to those described in relation to blocks 402 through 410 respectively. In these steps, the electrochromic control device 120 may gather information regarding an actual illuminance and a desired illuminance of the space associated with the electrochromic device, compare the gathered information, and adjust the electrochromic device in order to sufficiently match the actual illuminance and the desired illuminance.

In block 612, the electrochromic control device 120 may receive one of a high solar heat gain coefficient (SHGC) input and a low SGHC input. The high and low SHGC inputs may be used indicate whether it is desirable to shield or expose the space from solar heat (e.g., permit solar heat to pass through the electrochromic device 110 or block solar heat from passing through). In one example, the input may be a user preference provided from the user control unit 190. For instance, the input may be a user's instruction to pass/block an amount of solar heat through the electrochromic device, allowing the interior space to either warm or cool. In another example, the input may be provided from a climate characteristic indicator, such as the HVAC system 182. For instance, an input indicating whether the HVAC system is presently heating or cooling the interior space may indicate whether it is desirable for the electrochromic device 110 to pass or block solar heat. In another example, the input may be provided from a climate characteristic sensor, such as the outdoor temperature sensor 194. For instance, an input indicating the current outdoor temperature may indicate a particular season (e.g., summer, winter), which in turn may indicate whether it is desirable for the electrochromic device 110 to pass or block solar heat (e.g., pass solar heat in the winter to keep the space warm, block solar heat in the summer to keep the space cool). In another example, the input may be received from a room characteristic sensor, such as the indoor temperature sensor 184. For instance, an input indicating the current indoor temperature may indicate whether it is desirable to heat the space or cool the space, similar to an input indicating current operation of the HVAC system.

In other examples, the electrochromic control device 120 may not need to receive a high SHGC or low SHGC input from an external sensor or device. Rather, the electrochromic control device may receive the input from its own memory 134 in the form of a calendar date stored in the climate information 136. For instance, the stored calendar date, like the outdoor temperature sensor, may indicate the current occurrence of a particular season (e.g., summer, winter), which in turn may indicate whether it is desirable for the electrochromic device 110 to pass or block solar heat (e.g., pass solar heat in the winter to keep the interior space warm, block solar heat in the summer to keep the interior space cool).

In block 614, the electrochromic control device 120 may determine whether the input received is a high SHGC input or a low SHGC input. For example, the electrochromic control device 120 may interpret the input either as a request to operate the electrochromic device at a transmission state with a relatively high SHGC, or at a transmission state having a comparatively lower SHGC. This may be especially useful in situations where the electrochromic device may be operable in more than one transmission state for which the actual illuminance sufficiently matches the desired illuminance, one of the transmission states having a higher SHGC than another one of the transmission states. If the electrochromic control device 120 receives a high SHGC input, then operations may continue in block 616, in which the electrochromic control device 120 may maintain the electrochromic device 110 at the first transmission state, at which state the electrochromic device 110 has a high SHGC. If the electrochromic control device 120 receives a low SHGC input, then operations may continue in block 618, in which the electrochromic control device 120 may set the electrochromic device 110 to a second transmission state for which the actual illuminance and desired illuminance sufficiently match and the electrochromic device has a low SHGC.

The electrochromic control device 120 may alternatively receive other inputs indicating quantities and values related to warming and cooling a space by transmitting or blocking heat through the electrochromic device 110. For instance, the electrochromic control device 120 may receive an input indicating an amount of infrared radiation that is desired to be transmitted through the electrochromic device 110.

In some cases, the electrochromic device 110 may be controlled by both inputs relating to color and SHGC. In such cases, the electrochromic device may be controlled according to any existing control scheme, including, without limitation, the scheme depicted by the logic table of FIG. 7. In the example logic table of FIG. 7, the electrochromic device 110 may be set to one of two "clear states," or transmission states having a relatively high transmissivity. State A exhibits a yellow color and a high SHGC while State B exhibits a more aesthetically pleasing green color and a low SHGC. If solar heat gain is desired and a yellow color is tolerable to the user, the electrochromic control device 120 may set the electrochromic device 110 to operate in State A. Otherwise, if solar heat gain is not desired, or if the yellow color of State A is not tolerable to the user, the electrochromic control device 120 may set the electrochromic device 110 to operate in State B.

In other examples of the disclosure, the illuminance, color, and solar heat inputs may be combined with several other inputs as part of an energy management protocol. The truth table of FIG. 8 demonstrates a logic scheme for one such example energy management protocol. In the example of FIG. 8, an energy management protocol may receive several inputs indicating a desired operation of the electrochromic device 110. For example, the energy management protocol may receive inputs indicating whether the interior space is occupied, whether it is desired to heat the space (or alternatively, to cool the space), whether the space is receiving excess daylight, and whether the space is receiving excess solar glare. Each of these inputs may be provided by internally stored information or external sensors, as described above in relation to other aspects of the disclosure.

In the example of FIG. 8, the energy management protocol may begin with the electrochromic control device 120 determining whether the space is occupied. If the space is not occupied (denoted as "N" in FIG. 8), the electrochromic control device 120 may either set the electrochromic device 110 to a high SHGC clear state (State A in the example of FIG. 7) or to a low transmissivity state, depending on whether it is desired to heat or cool the space, respectively. The low transmissivity state may correspond to any transmission state that is sufficiently opaque to block a substantial amount of solar heat, for example, a transmission state at which only between about 2% and about 25% of visible light is transmitted. In some embodiments, the low transmissivity state may correspond to any transmission state at which less than 25% of visible light is transmitted.

If the space is occupied (denoted as "Y" in FIG. 8), the electrochromic control device 120 may further determine whether the space is receiving excess daylight. If the space is receiving excess daylight ("Y"), the electrochromic control device 120 may set the electrochromic device 110 to a transmission state yielding the desired illuminance in the space. Further, if the space is receiving excess glare ("Y"), the electrochromic control device 120 may set the electrochromic device 110 to a low transmissivity state to block the excess glare from entering the space.

If the space is not receiving excess daylight ("N"), the electrochromic control device 120 may further determine whether it is desired to heat the space (or alternatively, to cool the interior space). If it desired to heat the space ("Y"), the electrochromic control device 120 may set the electrochromic device 110 to a high SHGC clear state (State A in the example of FIG. 7). If it is desired to cool the space ("N"), the electrochromic control device 120 may set the electrochromic device 110 to a low SHGC clear state (State B in the example of FIG. 7).

In some examples of the disclosure, the low transmissivity state for blocking excess glare and the low transmissivity state for blocking solar heat may correspond to the same transmissivity state. In other examples, they may correspond to different transmissivity states. For instance, in order to block excess glare, the electrochromic device 110 may be set to a state at which only about 2% of visible light is transmitted through the device. Yet the electrochromic device 110 may block substantially the same amount of solar heat when set to any state at which between about 2%-6% of visible light is transmitted. Therefore, in such an instance, it may be beneficial to set the electrochromic device to a low transmissivity state at which only about 2% of visible light is transmitted through the device when the space is receiving excess glare, while the electrochromic device may be set to a low transmissivity state at which about 6% of visible light is transmitted when the space is vacant and it desired to cool the space.

The electrochromic device described in the above examples of the disclosure may be set to one or more high transmissivity states and may be set to one or more low transmissivity states. A high transmissivity state, in some examples of the disclosure, may refer to any state at which most (e.g., about 50% or more) visible light is transmitted through the device. In other examples, a high transmissivity state may refer to any state at which a substantial amount of (e.g., about 25% or more) visible light is transmitted through the device. In other examples, a high transmissivity state may refer to any state at which a small variation in visible light transmittance may result in a significant variation to another property of the electrochromic device, such as the color or SHGC of the device (e.g., about 60-65% or more visible light is transmitted through the device).

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implement using digital circuits, and vice versa. Embodiments may be in accordance with any one or more of the items as listed below.

Item 1. A control device for varying the transmittance of an electrochromic device, the control device comprising:

a power source electrically coupled to the electrochromic device, the power source configured to supply power to the electrochromic device;

an electrical load sensing circuit coupled to the electrochromic device, the electrical load sensing circuit configured to measure at least one of a voltage and a current supplied to the electrochromic device; and a processor electrically coupled to the electrical load sensing circuit and the power source, the processor configured to receive a measured electrical load value from the electrical load sensing circuit indicating an electrical property of the electrochromic device, and to control one or more properties of the electrochromic device by controlling the amount of current or voltage supplied from the power source to the electrochromic device;

wherein the processor is configured to vary a property of the electrochromic device while maintaining the electrochromic device at a substantially consistent transmissivity.

Item 2. The control device of item 1, wherein the processor is configured to set the electrochromic device to a first transmission state having a high b* characteristic value and a second transmission state having a low b* characteristic value, the first transmission state having a transmissivity within about 5% of the transmissivity of the second transmission state.

Item 3. The control device of item 2, wherein the difference between the high b* characteristic value and the low b* characteristic value is about 4.5.

Item 4. The control device of item 2, wherein both the first transmission state and the second transmission state have a b* characteristic value about 8 or greater.

Item 5. The control device of item 1, wherein the processor is configured to set the electrochromic device to a first transmission state having a high solar heat gain coefficient and a second transmission state having a low solar heat gain coefficient, the first transmission state having a transmissivity within about 5% of the transmissivity of the second transmission state.

Item 6. The control device of item 5, wherein the difference between the high solar heat gain coefficient and the low solar heat gain coefficient is between about 15% to about 25%.

Item 7. The control device of item 6, wherein the difference between the high solar heat gain coefficient and the low solar heat gain coefficient is about 25%.

Item 8. The control device of item 5, wherein both the first transmission state and the second transmission state have a solar heat gain coefficient between about 0.4 and about 0.55.

Item 9. The control device of item 1, wherein the processor is configured to set the electrochromic device to a first transmission state having a color with a peak wavelength of between about 560 nm and about 595 nm, and a second transmission state having a second color substantially different from the first color, the first transmission state having a transmissivity within about 5% of the transmissivity of the second transmission state.

Item 10. The control device of item 9, wherein the distance between the first color and the second color in L*a*b* color space is about 5 or greater.

Item 11. The control device of item 1, wherein the processor is configured to set the electrochromic device to a first transmission state having a first amount of infrared radiation transmitted through the electrochromic device and a second transmission state having a second amount of infrared radiation transmitted through the electrochromic device substantially different from the first amount, the first transmission state having a transmissivity within about 5% of the transmissivity of the second transmission state.

Item 12. The control device of item 11, wherein both the first transmission state and the second transmission state admit at least about 60% of visible light to be transmitted through the electrochromic device.

Item 13. The control device of item 1, wherein the power source comprises a photovoltaic cell.

Item 14. The control device of item 1, further comprising a memory circuit storing correlation information indicating a correlation between a first property of the electrochromic device and a second property of the electrochromic device, the processor further configured to control the electrochromic device based on the correlation information.

Item 15. The control device of item 14, wherein the first property of the electrochromic device is a color of the electrochromic device and the second property of the electrochromic device is an amount of visible light transmitted by the electrochromic device.

Item 16. The control device of item 14, wherein the first property of the electrochromic device is an amount of infrared radiation transmitted through the electrochromic device and the second property of the electrochromic device is an amount of visible light transmitted by the electrochromic device.

Item 17. The control device of item 14, wherein the memory circuit further comprises climate information indicating at least one of a current date, a current time, and a current position of the Sun relative to the electrochromic device.

Item 18. The control device of item 1, wherein the processor is configured to:

receive an input from an occupancy sensor, the input indicating whether the space associated with the electrochromic device is vacant or occupied; and control the electrochromic device based on the input received from the occupancy sensor.

Item 19. The control device of item 1, wherein the processor is configured to:

receive an input from a temperature sensor, the input indicating a temperature of the space associated with the electrochromic device; and control the electrochromic device based on the input received from the temperature sensor.

Item 20. The control device of item 1, wherein the processor is configured to:

receive an input from an infrared sensor, the input indicating an amount of infrared radiation transmitted through the electrochromic device; and control the electrochromic device based on the input received from the infrared sensor.

Item 21. The control device of item 1, wherein the processor is configured to:

receive an input from a daylight sensor, the input indicating an illuminance of the space associated with the electrochromic device; and control the electrochromic device based on the input received from the daylight sensor.

Item 22. A method for controlling transmissivity of an electrochromic device, the method comprising:

determining a range of transmission states for which an illuminance in a space associated with the electrochromic device is within a threshold amount from a desired illuminance;

receiving a color input indicating a range of colors at which is unacceptable to maintain the electrochromic device;

when at least one transmission state within the determined range of transmission states is a color that is not within the range of colors, setting the electrochromic device to a first transmission state within the determined range of transmission states, the first transmission state having a color that is not within the range of colors; and when every transmission state within the determined range of transmission states is within the range of colors, setting the electrochromic device to a second transmission state having a color that is not within the range of colors, the second transmission state having a transmissivity that is substantially similar to the transmissivity of the first transmission state.

Item 23. The method of item 22, wherein the illuminance input is received from a daylight sensor.

Item 24. The method of item 22, wherein the color input is received from a user input.

Item 25. The method of item 22, wherein the range of colors at which is unacceptable to maintain the electrochromic device includes a color having a peak wavelength of between about 560 nm and about 595 nm.

Item 26. The method of item 22, wherein the visible transmittance of the electrochromic device is about 5% lower when operating in the second transmission state than when operating in the first transmission state.

Item 27. A method for controlling transmissivity of an electrochromic device, the method comprising:

receiving an illuminance input indicating an amount of illuminance in a space; receiving a color input indicating whether a high b* characteristic value is tolerated for the electrochromic device;

determining a desired range of transmission states based on the illuminance input; when a high b* characteristic value is tolerated for the electrochromic device, setting the electrochromic device to a first transmission state associated with a first color of the electrochromic device, the first color having a high b* characteristic value, wherein the first transmission state is within the desired range of transmission states; and when a high b* characteristic value is not tolerated for the electrochromic device, setting the electrochromic device to a second transmission state associated with a second color, the second color having a low b* characteristic value, wherein the second transmission state is within the desired range of transmission states.

Item 28. The method of item 27, wherein each of the first and second transmission states admits about 60% or more visible light through the electrochromic device.

Item 29. The method of item 27, wherein the visible transmittance of the electrochromic device is about 5% lower when operating in the second transmission state than when operating in the first transmission state.

Item 30. The method of item 27, wherein the difference between the b* characteristic values of the first color and the second color is about 4.5 or more.

Item 31. The method of item 27, wherein the difference between the first color and the second color in L*a*b* color space is about 5 or more.

Item 32. A method for controlling transmissivity in an electrochromic device, the method comprising:

receiving an illuminance input indicating an amount of illuminance in a space;

receiving a solar heat input indicating whether it is desired to warm or cool the space;

determining a range of transmission states for which the amount of illuminance in the space is within a threshold amount from a desired amount of illuminance;

when it is desired to warm the space, setting the electrochromic device to a first transmission state having a first solar heat gain coefficient, wherein the first transmission state is within the determined range of transmission states; and when it is desired to cool the space, setting the electrochromic device to a second transmission state having a second solar heat gain coefficient, wherein the second transmission state is within the determined range of transmission states, and wherein the second solar heat gain coefficient is less than the first solar heat gain coefficient.

Item 33. The method of item 32, wherein each of the first and second transmission states has a transmissivity of about 60% or greater.

Item 34. The method of item 32, wherein the visible transmittance of the electrochromic device is about 5% lower when operating in the second transmission state than when operating in the first transmission state.

Item 35. The method of item 32, wherein the first solar heat gain coefficient is between about 15% to about 25% greater than the second solar heat gain coefficient.

Item 36. The method of item 35, wherein the first solar heat gain coefficient is about 25% greater than the second solar heat gain coefficient.

Item 37. The method of item 32, further comprising:

receiving a vacancy input indicating whether the interior space is vacant; and when the interior space is vacant and solar heat is not desired to be transmitted through the electrochromic device, setting the electrochromic device to a third transmission state having a transmissivity less than either of the first transmission state and the second transmission state.

Item 38. The method of item 30, wherein the vacancy input is received from at least one of a building maintenance system and an occupancy sensor.

Item 39. A method for controlling transmissivity in an electrochromic device, the method comprising:

receiving a color input indicating whether it is acceptable for the electrochromic device to be set to a color having a high b* characteristic value;

receiving a solar heat input indicating whether it is desired to warm or cool the interior space;

if the color input indicates that it is acceptable for the electrochromic device to be set to a color having a high b* characteristic value and the solar heat input indicates that it is desired to warm the interior space, setting the electrochromic device to a first transmission state having a high infrared radiation transmittance and high b* characteristic value;

if the color input indicates that it is not acceptable for the electrochromic device to be set to a color having a high b* characteristic value and the solar heat input indicates that it is desired to warm the interior space, setting the electrochromic device to a second transmission state having a low infrared radiation transmittance and low b* characteristic value; and if the solar heat input indicates that it is desired to cool the interior space, setting the electrochromic device to the second transmission state.

Item 40. The method of item 39, wherein the difference between the transmissivity of the electrochromic device in each of the first transmission state and the second transmission state is about 5% or less.

Item 41. The method of item 39, wherein both the first transmission state and the second transmission state admit at least about 60% of visible light to be transmitted through the electrochromic device.

Item 42. The method of item 39, wherein the solar heat gain coefficient of the first transmission state is about 15% to about 25% greater than the solar heat gain coefficient of the second transmission state.

Item 43. The method of item 42, wherein the first solar heat gain coefficient is about 25% greater than the second solar heat gain coefficient.

Item 44. The method of item 42, wherein both the first transmission state and the second transmission state have a solar heat gain coefficient between about 0.4 and about 0.55.

Item 45. The method of item 39, wherein the distance between the color of the electrochromic device in the first transmission state and in the second transmission state as measured in L*a*b* color space is at least about 5.

Item 46. The method of item 39, wherein the distance between the b* characteristic value of the color of the electrochromic device in the first transmission state and the b* characteristic value of the color of the electrochromic device in the second transmission state as measured in L*a*b* color space is at least about 4.5.

Item 47. The method of item 46, wherein both the first transmission state and the second transmission state have a b* characteristic value about 8 or greater.

Item 48. A method for controlling transmissivity in an electrochromic device, the method comprising:
receiving each of an occupancy input, a solar heat input, an illuminance input and a solar glare input, the occupancy input indicating whether a space associated with the electrochromic device is vacant or occupied, the solar heat input indicating whether it is desired to warm or cool the space, the illuminance input indicating whether there is an excess of daylight in the space, and the solar glare input indicating whether there is an excess of glare in the space;
determining, based at least in part on the occupancy input, whether the space is vacant or occupied;
if the space is vacant:
  determining whether it is desired to warm or cool the space;
  if it is desired to warm the space, setting the electrochromic device to a first transmission state having a high transmissivity and high solar heat gain coefficient; and
  if it is desired to cool the space, setting the electrochromic device to a transmission state having a low transmissivity for blocking solar heat;
if the space is occupied:
  determining whether there is an excess of daylight in the space;
  if there is an excess of daylight in the space:
  determining whether there is an excess of glare in the space;
  if there is an excess of glare in the space, setting the electrochromic device to a transmission state having a low transmissivity for blocking excess glare; and
  if there is not an excess of glare in the space, setting the electrochromic device to a transmission state yielding an illuminance for which there is not an excess of daylight in the space; and
  if there is not an excess of daylight in the space:
  determining whether it is desired to warm or cool the space;
  if it is desired to warm the space, setting the electrochromic device to the first transmission state; and
  if it is desired to cool the space, setting the electrochromic device to a transmission state having a high transmissivity and low solar heat gain coefficient.

Note that not all of the activities described above in the general description or the examples are required, that a portion of a specific activity may not be required, and that one or more further activities may be performed in addition to those described. Still further, the order in which activities are listed is not necessarily the order in which they are performed.

A low transmissivity state, in some examples of the disclosure, may refer to any state at which less than a substantial amount of (e.g., about 25% or more) visible light is transmitted through the device. In other examples, a low transmissivity state may refer to any state at which less than most (e.g., about 50% or more) visible light is transmitted through the device. In other examples, a low transmissivity state may refer to any state at which excess glare and/or solar heat is substantially blocked (e.g., about 2%-6% or less visible light is transmitted through the device).

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for controlling transmissivity of an electrochromic device, the method comprising:
receiving an illuminance input indicating an amount of illuminance in a space;
receiving a color input indicating whether a high b* characteristic value is tolerated for the electrochromic device;
determining a desired range of transmission states based on the illuminance input;
when a high b* characteristic value is tolerated for the electrochromic device, setting the electrochromic device to a first transmission state associated with a first color of the electrochromic device, the first color having a high b* characteristic value, wherein the first transmission state is within the desired range of transmission states; and
when a high b* characteristic value is not tolerated for the electrochromic device, setting the electrochromic device to a second transmission state associated with a second color, the second color having a low b* characteristic value, wherein the second transmission state is within the desired range of transmission states.

2. The method of claim 1, wherein each of the first and second transmission states admits about 60% or more visible light through the electrochromic device.

3. The method of claim 1, wherein the visible transmittance of the electrochromic device is about 5% lower when operating in the second transmission state than when operating in the first transmission state.

4. The method of claim 1, wherein the difference between the b* characteristic values of the first color and the second color is about 4.5 or more.

5. The method of claim 1, wherein the difference between the first color and the second color in L*a*b* color space is about 5 or more.

6. A method for controlling transmissivity in an electrochromic device, the method comprising:
receiving an illuminance input indicating an amount of illuminance in a space;
receiving a solar heat input indicating whether it is desired to warm or cool the space;
determining a range of transmission states for which the amount of illuminance in the space is within a threshold amount from a desired amount of illuminance;
when it is desired to warm the space, setting the electrochromic device to a first transmission state having a first solar heat gain coefficient, wherein the first transmission state is within the determined range of transmission states; and
when it is desired to cool the space, setting the electrochromic device to a second transmission state having a second solar heat gain coefficient, wherein the second transmission state is within the determined range of transmission states, and wherein the second solar heat gain coefficient is less than the first solar heat gain coefficient.

7. The method of claim 6, wherein each of the first and second transmission states has a transmissivity of about 60% or greater.

8. The method of claim 6, wherein the visible transmittance of the electrochromic device is about 5% lower when operating in the second transmission state than when operating in the first transmission state.

9. The method of claim 6, wherein the first solar heat gain coefficient is between about 15% to about 25% greater than the second solar heat gain coefficient.

10. The method of claim 9, wherein the first solar heat gain coefficient is about 25% greater than the second solar heat gain coefficient.

11. The method of claim 6, further comprising:
receiving a vacancy input indicating whether the interior space is vacant; and
when the interior space is vacant and solar heat is not desired to be transmitted through the electrochromic device, setting the electrochromic device to a third transmission state having a transmissivity less than either of the first transmission state and the second transmission state.

12. The method of claim 11, wherein the vacancy input is received from at least one of a building maintenance system and an occupancy sensor.

13. A method for controlling transmissivity in an electrochromic device, the method comprising:
receiving a color input indicating whether it is acceptable for the electrochromic device to be set to a color having a high b* characteristic value;
receiving a solar heat input indicating whether it is desired to warm or cool the interior space;
if the color input indicates that it is acceptable for the electrochromic device to be set to a color having a high b* characteristic value and the solar heat input indicates that it is desired to warm the interior space, setting the electrochromic device to a first transmission state having a high infrared radiation transmittance and high b* characteristic value;
if the color input indicates that it is not acceptable for the electrochromic device to be set to a color having a high b* characteristic value and the solar heat input indicates that it is desired to warm the interior space, setting the electrochromic device to a second transmission state having a low infrared radiation transmittance and low b* characteristic value; and
if the solar heat input indicates that it is desired to cool the interior space, setting the electrochromic device to the second transmission state.

14. The method of claim 13, wherein the difference between the transmissivity of the electrochromic device in each of the first transmission state and the second transmission state is about 5% or less.

15. The method of claim 13, wherein both the first transmission state and the second transmission state admit at least about 60% of visible light to be transmitted through the electrochromic device.

16. The method of claim 13, wherein the solar heat gain coefficient of the first transmission state is about 15% to about 25% greater than the solar heat gain coefficient of the second transmission state.

17. The method of claim 16, wherein both the first transmission state and the second transmission state have a solar heat gain coefficient between about 0.4 and about 0.55.

18. The method of claim 13, wherein the distance between the color of the electrochromic device in the first transmission state and in the second transmission state as measured in L*a*b* color space is at least about 5.

19. The method of claim 13, wherein the distance between the b* characteristic value of the color of the electrochromic device in the first transmission state and the b* characteristic value of the color of the electrochromic device in the second transmission state as measured in L*a*b* color space is at least about 4.5.

20. The method of claim 19, wherein both the first transmission state and the second transmission state have a b* characteristic value about 8 or greater.

* * * * *